United States Patent [19]
Profit, Jr.

[11] Patent Number: 5,911,059
[45] Date of Patent: Jun. 8, 1999

[54] METHOD AND APPARATUS FOR TESTING SOFTWARE

[75] Inventor: Jack H. Profit, Jr., Seattle, Wash.

[73] Assignee: Applied Microsystems, Inc., Redmond, Wash.

[21] Appl. No.: 08/768,813

[22] Filed: Dec. 18, 1996

[51] Int. Cl.$^6$ ........................................... G06F 9/455
[52] U.S. Cl. ................ 395/500; 395/551; 395/559; 395/183.13; 395/183.15; 395/183.22; 395/183.06
[58] Field of Search ................... 364/232.3, 221, 364/240, 240.5, 241.2, 264, 264.3, 267, 270, DIG. 1, 926.9, 926.91, 578, 489, 490; 395/500, 568, 559, 551, 183.1, 183.13, 183.15, 185.03, 185.04, 185.08, 185.09, 183.22, 183.06, 200.62, 200.48; 371/5.4, 22.1, 22.4, 21.3, 62, 22.3

[56] References Cited

U.S. PATENT DOCUMENTS

| | | | |
|---|---|---|---|
| 3,891,974 | 6/1975 | Coulter et al. | 395/500 |
| 4,899,306 | 2/1990 | Greer | 364/900 |
| 5,045,994 | 9/1991 | Belfer et al. | 364/200 |
| 5,157,782 | 10/1992 | Tuttle et al. | 395/575 |
| 5,327,361 | 7/1994 | Long et al. | 364/578 |
| 5,329,471 | 7/1994 | Swoboda et al. | 364/578 |
| 5,392,420 | 2/1995 | Balmer et al. | 395/500 |
| 5,546,562 | 8/1996 | Patel | 395/500 |
| 5,669,000 | 9/1997 | Jessen et al. | 395/704 |

*Primary Examiner*—Kevin J. Teska
*Assistant Examiner*—Thai Phan
*Attorney, Agent, or Firm*—Seed and Berry LLP

[57] ABSTRACT

A system for testing and analyzing electronic systems, including a target processor and simulated target circuitry, and an associated target program to be executed on the target microprocessor. The system includes a processor emulator employing a hardware device for emulating the target microprocessor. The processor emulator has a memory for storing a plurality of computer instructions, including the target program and associated data. The processor emulator communicates with the memory to receive computer instructions from the memory and to access program specific data structures. The system further includes a hardware simulator adapted to simulate the target circuitry. A communications interface controls communication between the processor emulator and the hardware simulator. The processor emulator communicates with the hardware simulator using the communications interface when an event requires interaction of the target program with the target circuitry. A synchronization circuit contained in the communications interface synchronizes the processor emulator and the hardware simulator at a time other than when an event requires interaction of the target program with the target circuitry.

35 Claims, 11 Drawing Sheets

METHOD AND APPARATUS FOR TESTING SOFTWARE

TECHNICAL FIELD

The present invention relates generally to computer hardware simulators, and, more specifically, to a system and method for the simulation of systems that combine hardware and software interaction.

BACKGROUND OF THE INVENTION

With the advent of 32-bit microprocessors and complex operating software, embedded systems have become very complex systems. The vast majority of electronic products built today include some form of computer hardware executing a stored software program. An embedded system may typically include a microprocessor executing instructions and interacting with an application specific integrated circuit (ASIC) or a custom Integrated Circuit (IC). The microprocessor used in the system is designated herein as a target microprocessor. The external circuitry that interacts with the target microprocessor, whether it is the ASIC, custom IC, or some other form of electronic circuitry, is designated herein as the target circuitry. The combination of the target circuitry and the target microprocessor is designated herein as the target hardware. The software program that is intended to be executed by the target microprocessor is designated herein as the target program.

Given the complexity and density of modern electronics designs, it is desirable that the first system prototype, including the target hardware and the target program, is typically close in form, fit, and function to the end product. The target hardware prototypes would therefore include the ASIC and custom IC designs, which were fabricated and passed their respective qualification and acceptance tests at the foundry.

The target program is typically designed, written, and tested, module by module. The module integration process also involves testing of the integrated software modules. However, because the target hardware may not be available at the time of the software development, it is not possible to test the interaction of the target hardware and the target program. To substitute for the missing target hardware, pieces of the design are "stubbed out," or mockups built to substitute for anticipated missing parts of the target hardware. The term "stubbed out" refers to a mock response to a program call to a location in the yet unbuilt circuitry. The programmer must program a return command that causes the target program to ignore the lack of a true response from the target circuitry. The substitution of mocked up target hardware requires further interpretation of the original hardware design specifications. It is common to find that no single combined software system integration occurs before the software is loaded onto the hardware prototype, let alone tested as a whole (stubbed out or otherwise).

Typically, the hardware and software components of a target system design are brought together for the first time when the prototype target hardware has been fabricated. Because of the prior unavailability of the actual target hardware, one often finds that the target program loaded at the time of the integration of the prototype target hardware and software does not work. It is common to find that the integration problems are strictly due to software complications alone. This may cause a significant delay in the software development due to the problems in the target program. Other problems with the integration may be caused by the interaction of the target hardware with the target program. Consequently, considering the large cost of ASIC and custom IC design, and the relatively low cost ease of software modification, it is common that the software will be force-fitted to the target hardware prototype, thereby increasing the overall planned software development time.

A number of approaches have been developed in an attempt to alleviate or at least minimize the software/hardware integration problems. One approach is to simulate the hardware using a computer hardware simulator. The hardware simulator is a software program that simulates the responses of the target hardware and is implemented entirely in software. Thus, in the hardware simulator, the target hardware and target program are simulated entirely by computer software. The hardware simulation method of verifying the target system is illustrated in FIG. 1. A hardware simulator 20 is a software program that accepts a description of the target hardware, including electrical and logical properties of the target microprocessor and the target circuitry. The target hardware design may be specified graphically by schematic diagrams or by a hardware description language (HDL), such as VHDL. The hardware simulator 20 is a commercially available product that includes a target program 22 that is compiled into object code, and the object code is downloaded into a processor memory model 24 within the hardware simulator 20. A processor functional model 26 is a software description, including the electrical and logical properties, of the target microprocessor, while a target circuitry functional model 28 provides a model of the target circuitry, such as an ASIC, or other custom or semi-custom design. The hardware simulator 20 allows the processor functional model 26 to simulate execution of the target program 22 event by event. The processor functional model 26 and the target circuitry functional model 28 can be specified to various levels of abstraction by a conventional HDL.

There are disadvantages in using the hardware simulator 20 to simulate the target hardware. Microprocessor manufacturers are cautious about providing the full-functional processor model 26 that could be reverse-engineered into a competitive product. In addition, the full-functional processor model 26 can be extremely detailed for a complex circuit such as the target microprocessor resulting in the execution time required to simulated the full-functional processor model 26 adding significantly to the simulation run-times. Another disadvantage is that the target program 22 can be quite long, which leads to the additional burden of trying to run longer simulation required for larger target program 22 into the processor memory model 24 can consume large amounts of system resources, and simulation run time can become unacceptably long. Typical simulation speeds may only reach 2–4 microprocessor instructions per second. Also, if the target program 22 malfunctions, then the programmer has the unenviable task of debugging the target program typically without the aid of debuggers or any other software design and analysis tools.

Another approach is a form of software simulation of the target hardware using an instruction set simulator (ISS) 40, illustrated in FIG. 2. The ISS 40 includes a memory 42 that contains the target program 22. The ISS 40 strives to guarantee functional accuracy of both instruction functions and memory references only at the processor instruction level. As a result, accuracy to detailed internal timing is sacrificed for speed. The speed of a typical ISS 40 is on the order of 1,000–10,000 microprocessor instructions per second. The ISS 40 executes the target program 44, but has only limited visibility to circuitry outside of the target microprocessor. The typical ISS 40 does not represent any custom target circuitry in simulation beyond a register reference, and hence is of limited value to hardware designers or software designers that are concerned with interactions with custom hardware.

These first two approaches simulate the target hardware completely in software. As known by those of ordinary skill in the art, total software simulation of the target hardware offers relatively low cost and flexibility. However, such a total software simulation suffers from the disadvantages that the target hardware often cannot be completely modeled without unacceptably long run-times.

A third approach, which alleviates the unacceptably long run-times encountered with the processor functional model 26 (see FIG. 1), is to replace the processor functional model in the hardware simulator 20 with a physical integrated circuit (IC) microprocessor 50, as illustrated in FIG. 3. The microprocessor 50 is connected to the hardware simulator 20 via a hardware modeler 52. The target program 22 is contained in the memory model 24 in the hardware simulator 20, and all instructions are executed out of the memory model 24, as previously discussed with respect to FIG. 1. The microprocessor 50 may be the actual target microprocessor or other circuit to simulate the behavior of the target microprocessor. It should be noted that the physical microprocessor 50 and the hardware modeler 52 are hardware components rather than software simulations. The cost of the typical hardware modeler 52 can be quite high, ranging from $40,000 to over $200,000.

A similar approach illustrated in FIG. 4 uses a device known as a processor emulator 60 to model the target processor. The processor emulator 60 is a hardware device that substitutes for the target microprocessor. Processor emulators are conventional devices presently available from sources such as Applied Microsystems Corporation. The processor emulator 60 includes a microprocessor 76, which is typically the target processor. The processor emulator 60 may also include an emulator memory 78 and a control circuit 80. The processor emulator 60 is coupled to a workstation 84 or computer terminal by a communications link 86. The workstation 84 may be a stand-alone computer workstation or simply a terminal coupled to a computer (not shown) to which the processor emulator 60 is also coupled. User interface software 88 within the workstation 84 controls the display of data on the workstation and permits user input to the emulator. The user interface software 88 and the control circuit 80 of the processor emulator 60 are conventional components of the processor emulator and add supplemental control to the prototype hardware system.

The processor emulator is coupled to an actual target system 62 having a memory 66 containing the target program 22, and a socket 70 for the target microprocessor. The processor emulator 60 is coupled to the target system 62 of the target hardware by a bus system 72 and typically plugs directly into the socket 70 as a substitute for the target microprocessor. The emulator memory 78 contains an emulator control program independent of the target program 22 in the memory 66. However, the target program 22 can also be loaded into the emulator memory 78 in what is sometimes called a memory overlay. Thus, the target program 22 can be executed from the memory 66, the emulator memory 78, or both. Execution of the target program 22 only from the emulator memory 78 allows execution of the target program without the benefit of software interaction with the target circuitry.

Instead of plugging into the actual target system 62 as shown in FIG. 4, the processor emulator 60 may interface with reconfigurable circuitry 96 as shown in FIG. 5. The reconfigurable circuitry 96 may be a field-programmable gate array (FPGA) which emulates target circuitry functions including the ASIC or custom IC. Companies such as Quickturn and Aptix have developed hardware circuit emulators which allow hardware designs to be downloaded into the reconfigurable circuitry 96 and mounted on a board-like device. As before, the hardware circuit emulator 60 includes a processor 76 and a memory 78. The target program 22 is stored in the memory 78 of the emulator 60 so that it can be executed by the processor 76. This approach, known as hardware circuit emulation, allows the target system to be tested as if it is already built. Hardware circuit emulation has the advantages of speed and early breadboard fabrication. However, high cost and tedium in configuration and debugging limit their application. These tools also lack hardware-software debugging visibility because access to internal registers and memory locations is not available. Also, the hardware circuit emulator 94 typically represent a major investment on the user's part, in both design effort and capital cost.

A final approach basically combines the use of the processor emulator 60 of FIGS. 4 and 5 with the target circuitry model 28 in the hardware simulator 20 of FIG. 3. This approach essentially substitutes the processor emulator 60 for the hardware modeler 52 shown in FIG. 3 except that the target program is executed out of the emulator memory 78. With reference to FIG. 6, this prior art approach couples the processor emulator 60 to an engineering workstation 100 simulating the target circuitry using a target circuitry model 28 through a communications interface 102. The workstation 100 with its target circuitry model 28 is thus a hardware simulator 104. The communications interface 102 provides communication between the processor emulator 60 and the hardware simulator 104 only when an event, either in the target program 22 or in the software simulation of the target circuit, requires interaction of the target program 22 and simulated target circuit. Thus, the processor emulator 60 and hardware simulator 104 are synchronized only when an event requires interaction between the two.

Each of the above-described approaches has advantages and disadvantages. Therefore, it can be appreciated that there is a significant need for a system that allows complete testing of the target hardware and software with efficiency and low cost. The present invention provides this and other advantages, as will be illustrated by the following description and accompanying figures.

SUMMARY OF THE INVENTION

The present invention is a system for testing and analyzing electronic systems which include a target microprocessor, simulated target circuitry, and an associated target program to be executed on the target microprocessor. In one embodiment, the system includes a processor emulator employing a hardware device for emulating the target microprocessor and its memory subsystem. The processor emulator has a memory for storing a plurality of computer instructions that include the target program. The processor emulator communicates with the memory to receive computer instructions from the memory. The system further includes a hardware simulator adapted to simulate the target circuitry. A communications interface controls communication between the processor emulator and the hardware simulator. The processor emulator communicates with the hardware simulator using the communications interface when an event requires interaction of the target program with the target circuitry.

A synchronization circuit contained in the communications interface synchronizes the processor emulator and the hardware simulator at a time other than when an event requires interaction of the target program with the target circuitry.

In a preferred embodiment of the synchronization circuit, the synchronization circuit comprises a counter and a one-shot timer, the operation of which periodically causes synchronization of the processor emulator and the hardware simulator. The period of synchronization may be input by a user, or may be determined in response to computer instructions or markers contained in the target program.

DETAILED DESCRIPTION OF THE INVENTION

The present invention allows for the early simulation of the target hardware and permits the parallel development of the target hardware and the target program. The system of the present invention also allows the extensive use of existing debugging tools to aid the developer in the development and integration of the target system. The system combines interacting elements of hardware and executing software, in part by physical emulation and in part by abstract software simulation.

Figure 7:
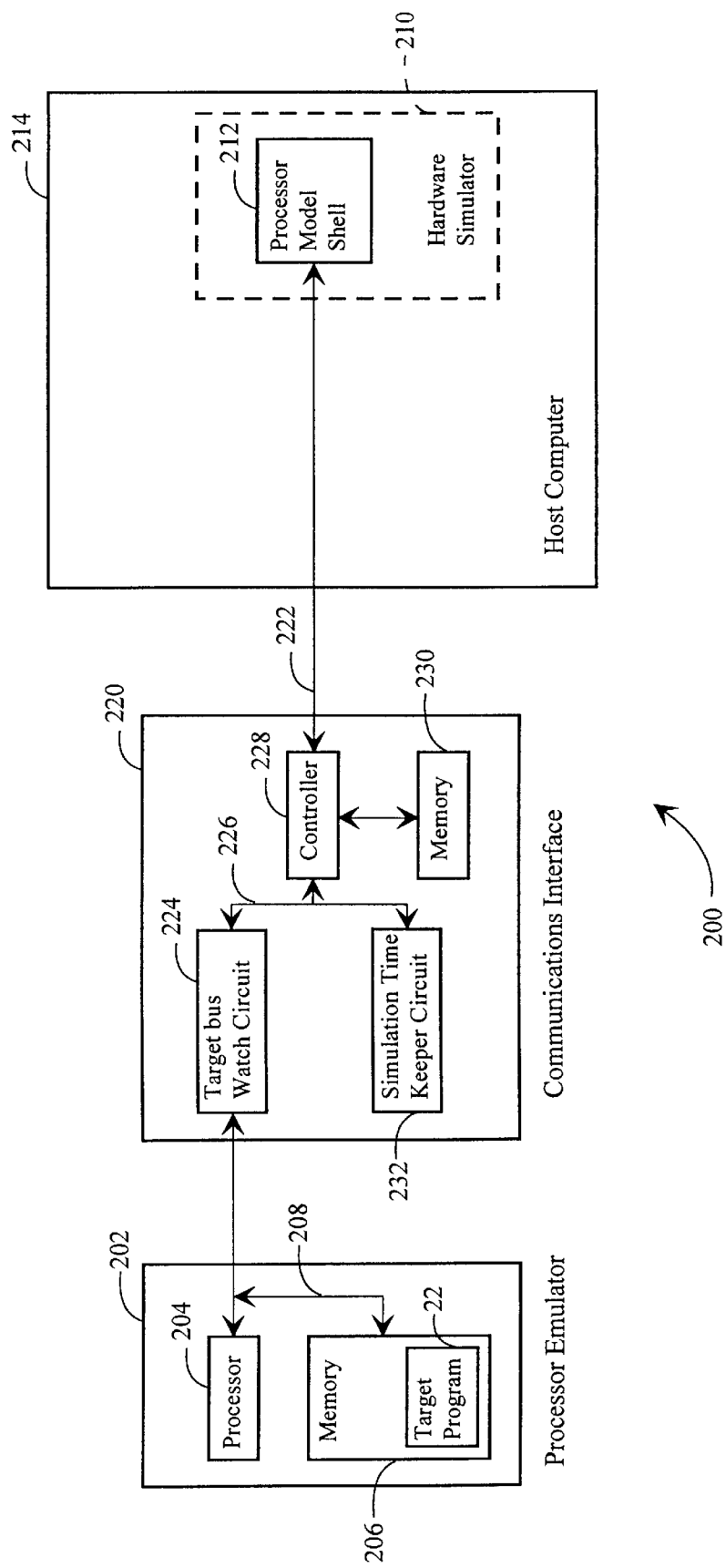
FIG. 7 is a functional block diagram of a preferred embodiment of the present invention.

A preferred embodiment of a testing system 200 according to the present invention is shown in FIG. 7. The system 200 includes three principal components, a processor emulator 202, a communications interface 220, and a host computer 214. In the system 200, part of the target hardware is modeled by the processor emulator 202 and part of the target hardware is modeled by a hardware simulator 210 running on the host computer 214. Specifically, the processor emulator 202 models the target processor, and the hardware simulator 210 models the target circuitry. The communications interface 220 facilitates communication between the processor emulator 202 and the hardware simulator 210. Operation of these components is described in more detail below.

Figure 1:
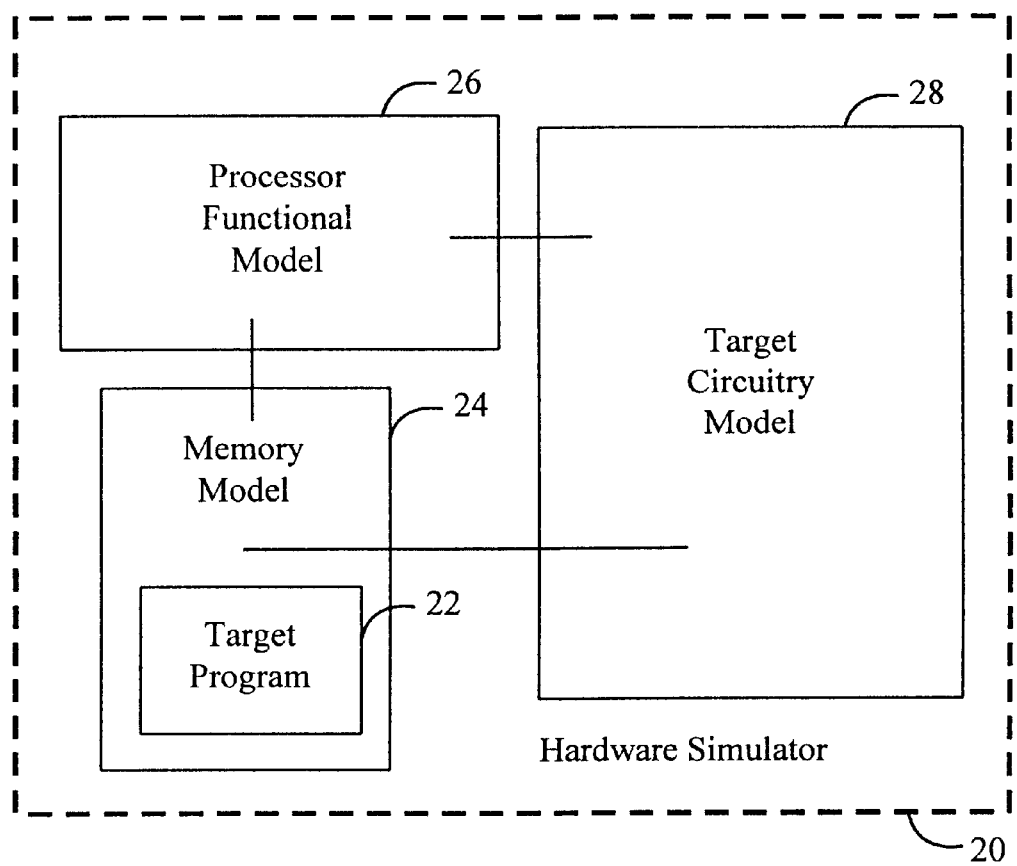
FIG. 1 is a functional block diagram of a traditional hardware simulator employing a processor functional model to simulate target program execution.
Figure 2:
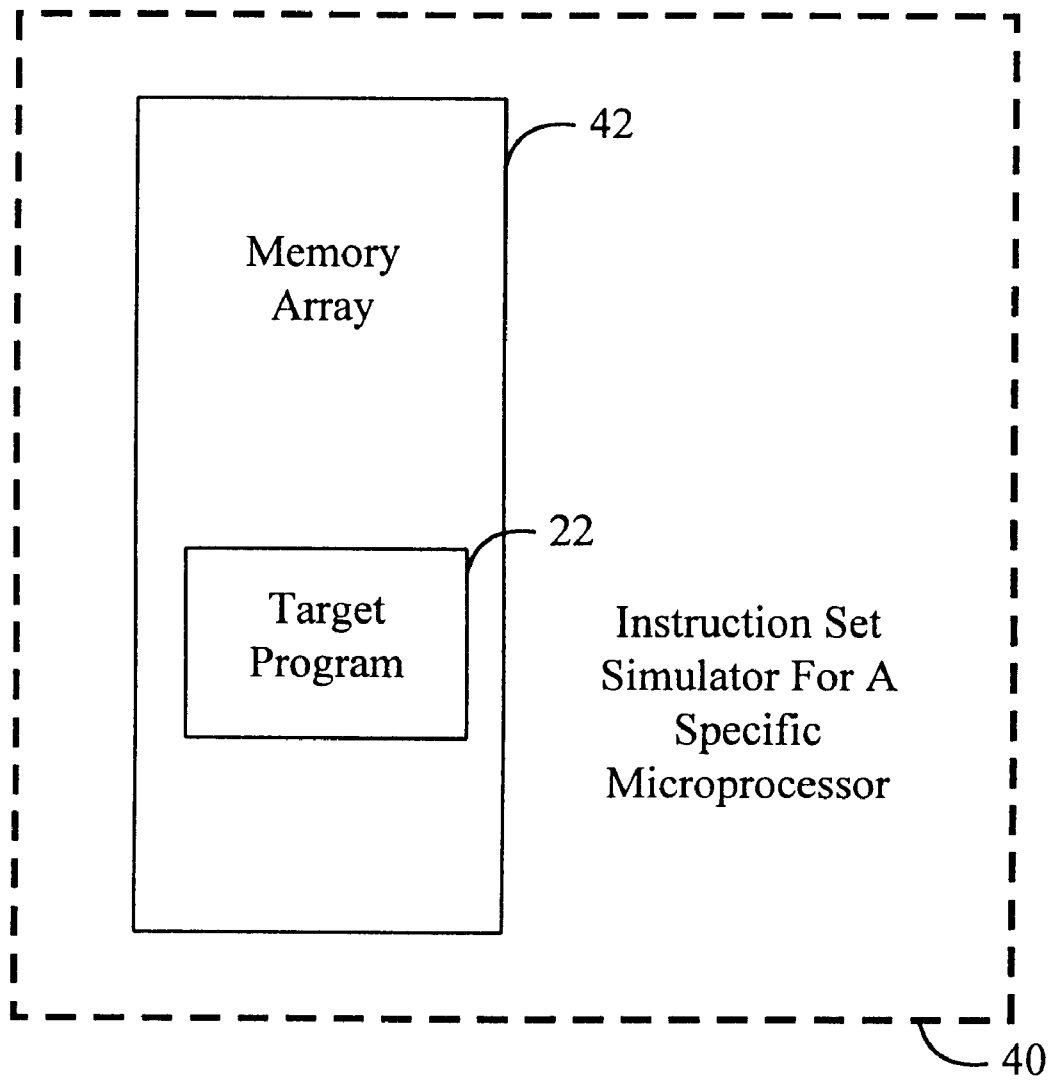
FIG. 2 is a functional block diagram of a conventional instruction set simulator.
Figure 3:
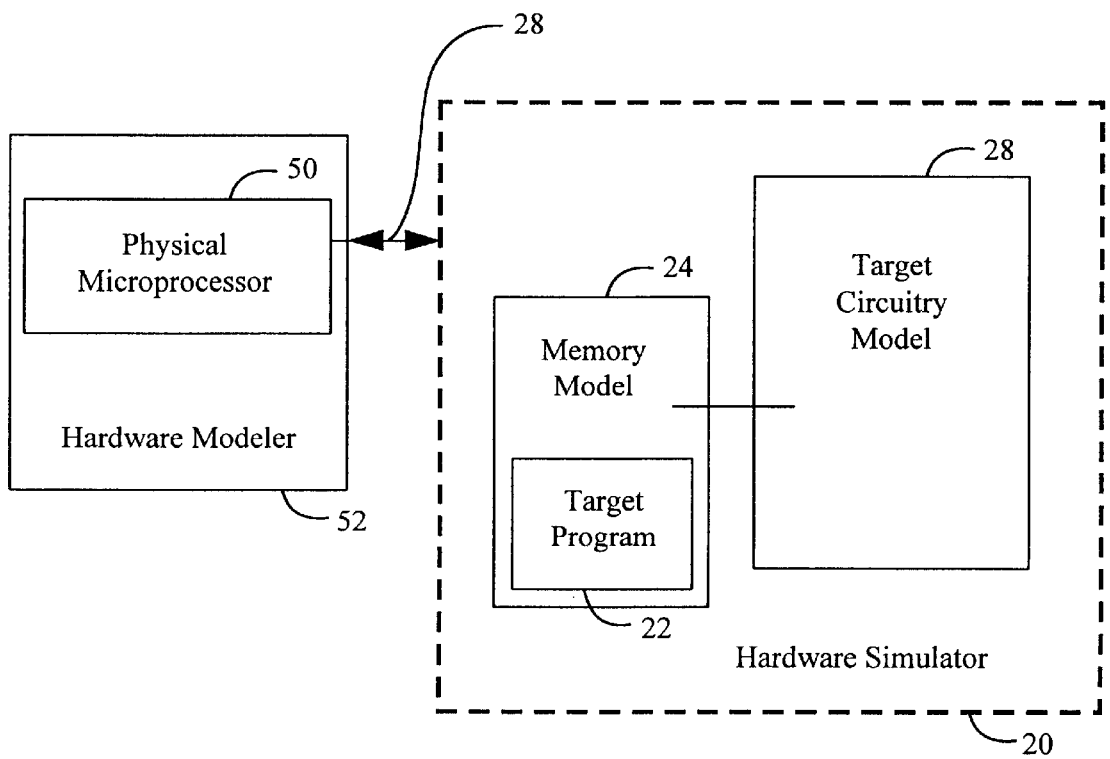
FIG. 3 is a functional block diagram of a traditional hardware simulator employing a hardware modeler to simulate target program execution.
Figure 4:
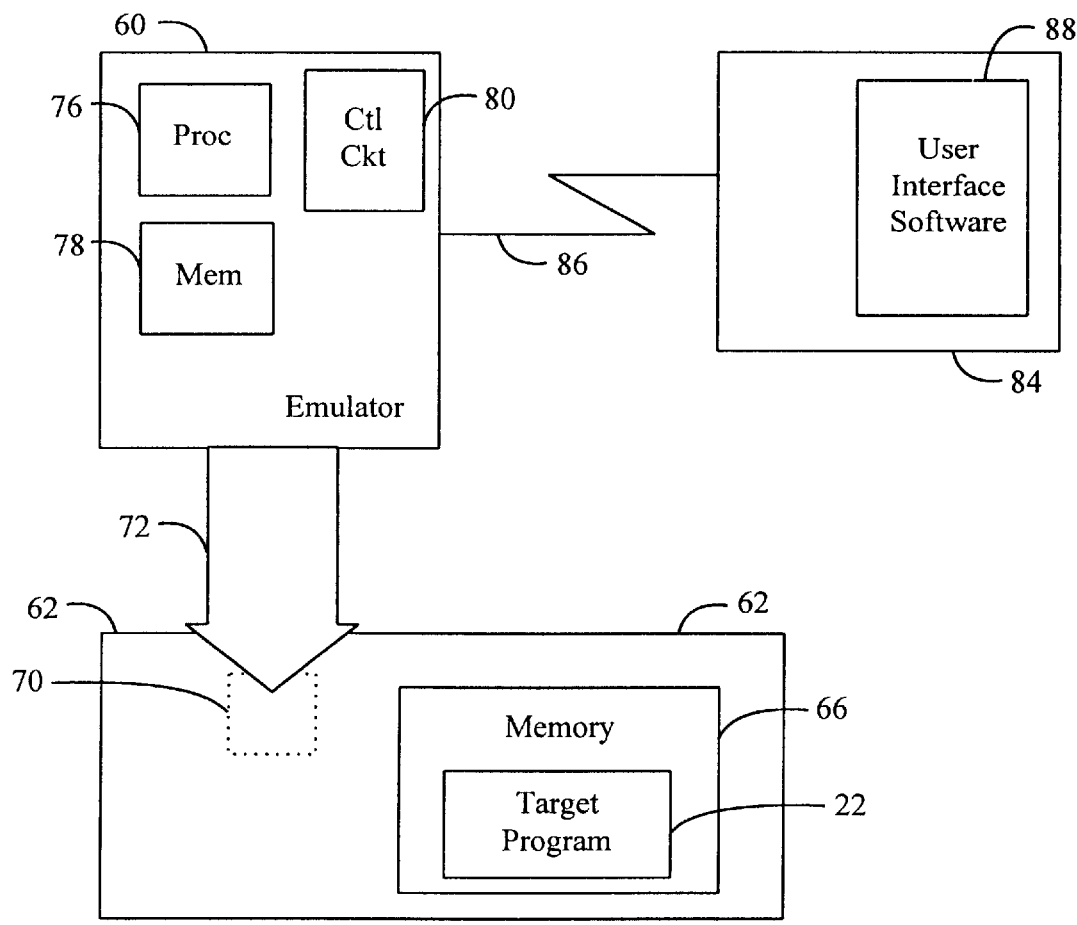
FIG. 4 is a functional block diagram of a conventional processor emulator connected to the actual target circuitry of a target system.
Figure 5:
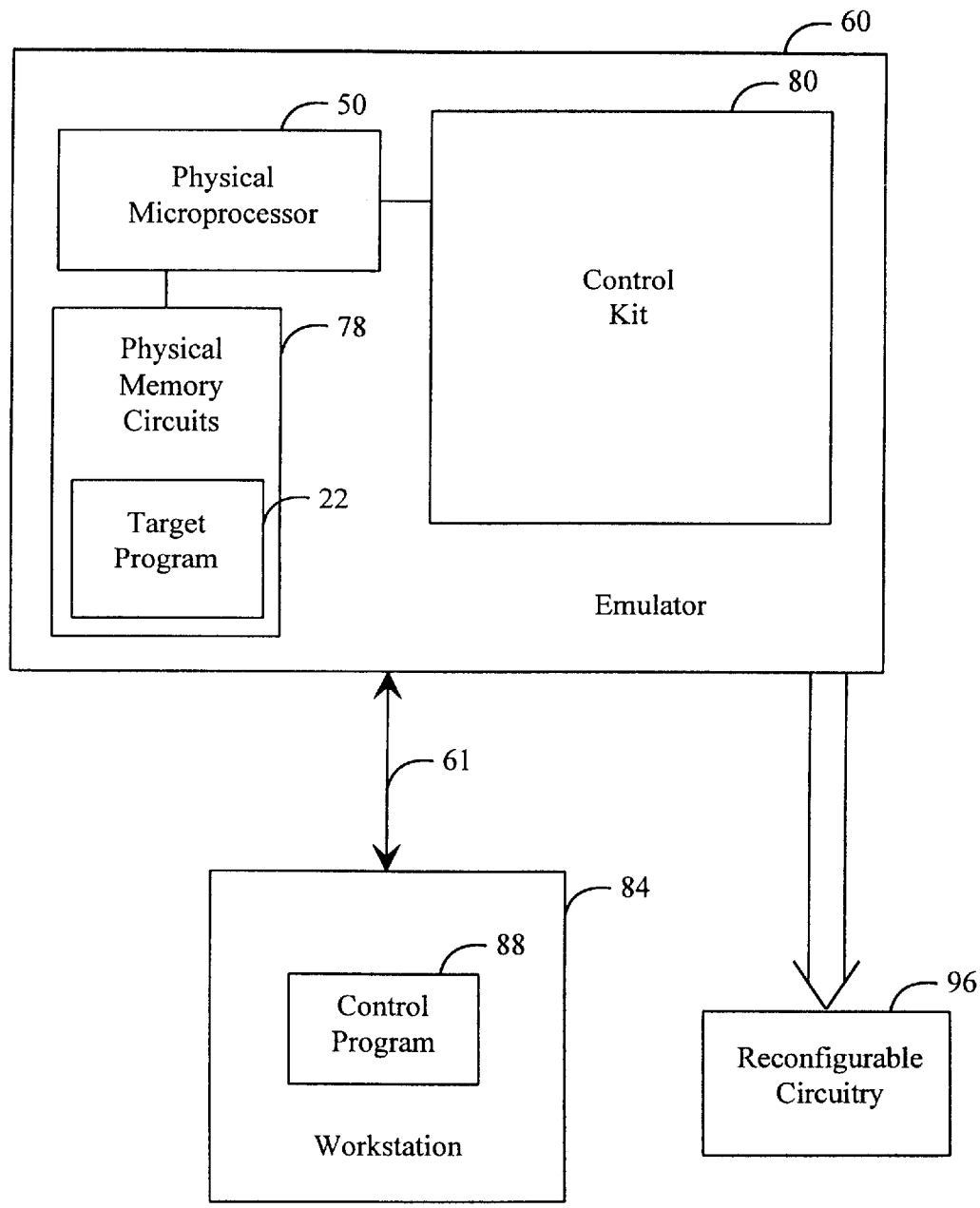
FIG. 5 is a functional block diagram of a conventional processor emulator connected to reconfigurable circuitry that models the target circuitry.
Figure 6:
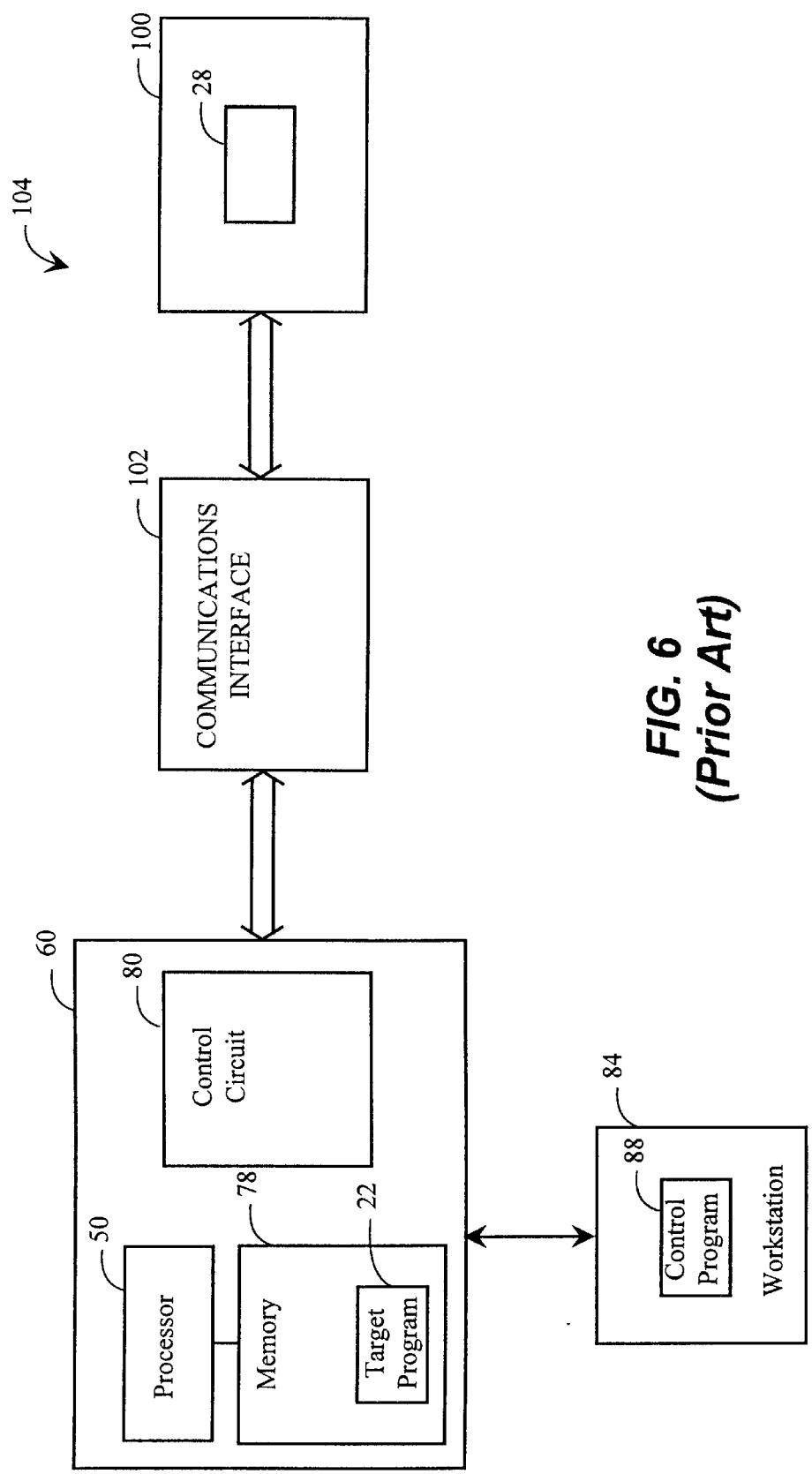
FIG. 6 is a functional block diagram of a processor emulator connected to a hardware simulator through a communications interface.

The processor emulator 202 is typically a commercially available microprocessor-based device, such as the microprocessor emulator 60 (see FIG. 4) manufactured by Applied Microsystems Corporation and others. However, it should be understood that other devices performing somewhat similar functions may be used instead of a microprocessor emulator. The processor emulator 202 includes a processor 204 coupled to a memory 206. The processor 204 communicates with the memory 206 to receive and execute computer instructions, including those in the target program 22, and to write data to and read data from the memory 206. Typically, the target program 22 is stored in the memory 206 but may also be stored elsewhere, such as in an external memory (not shown in FIG. 7). In one embodiment, the processor 204 is the target processor itself. The target processor 204 may, however, be realized with a separate device. For example, the processor emulator 202 may include additional components such as a field programmable gate array (FPGA) to form a hardware circuit emulation of the target processor.

In the testing system 200, the target circuitry portion of the target hardware is modeled by the hardware simulator 210. The hardware simulator 210 is a conventional software program that simulates the electrical and logical activity of the target circuitry as seen by the target processor. The hardware simulator 210 includes a processor model shell 212 which converts a sequence of processor functions to activity at simulated pins of the target processor. Such a sequence of processor functions corresponds to an instruction executed in the target program 22 which requires access to the software simulation of the target circuit. For example, assume that the target program 22 contains a memory read instruction that references an address location allocated to the address space of the target circuitry. In this case, a sequence of processor functions is input to the processor model shell 212 which cause the processor model shell to change the address, data, and control lines at the simulated pins to simulate the memory read instruction in the hardware simulator 210. The processor model shell 212 also converts interrupts or other events generated by target circuit components simulated in the hardware simulator 210 into a sequence of processor functions that allow the target program 22 executing in the processor emulator 202 to handle the interrupt or other event.

The hardware simulator 210 and processor model shell 212 typically run on a host computer 214, such as a SUN, HP, or other suitable workstation. As known by those skilled in the art, the host computer 214 typically contains other software tools to facilitate user interface to the system and the development of the software program which simulates the target circuitry. For example, the host computer 214 typically contains a software package for designing the simulation of the target circuitry either graphically using schematic diagrams or by a hardware description language (HDL). Software debugging tools are likewise typically contained on the host computer 214.

A software kernel (not shown in FIG. 7) is also typically contained on the host computer 214. The software kernel is coupled between the processor emulator 202 and the hardware simulator 210. The software kernel performs a conversion from a first data format used by the processor emulator 202 to a second data format used by the processor model shell 212 of the hardware simulator 210. Such a conversion is typically required because the first data format is different from the second data format. When an event in the target program 22 requires interaction of the target program and the target circuitry, this event is communicated in the first data format to the software kernel in the host computer 214. In response to receiving this event, the software kernel generates a sequence of processor functions in the second data format for use by the processor model shell 212. Conversely, a conversion from the second data format to the first data format is performed by the software kernel when the software program simulating the target circuitry in the hardware simulator 210 needs to interact with the target program 22 executing in the processor emulator 202.

Communication between the processor emulator 202 and the hardware simulator 210 is handled by a communications interface 220. The communications interface 220 is coupled to the processor emulator 202 and is coupled over a communication link 222 to the host computer 214. The communication link 222 may be a serial connection, parallel connection, network connection or other suitable communications interface structure. The communications link 222 coupling the communications interface 220 to the host computer 214 may be implemented as a set of TCP/IP sockets over an Ethernet link. However, a very low latency, dedicated, link, such as SCI or firewire, will generally be preferred in situations where the user requires real-time simulation speeds. Those of ordinary skill in the art will appreciate that the present invention is not limited by the particular form of the communications link 222.

The communications interface 220 performs two primary functions. First, it controls communication between the processor emulator 202 executing the target program 22 and the hardware simulator 210 executing the software simulation of the target circuit. Such communication occurs when the communications interface 220 determines that an event in the target program 22 requires access to the target circuit, or when an event in the target circuit needs access to the target program 22. An event in the target program 22 requiring interaction with the target circuit may be, for example, a reference (read or write) to an area of memory allocated to the target circuit, a reference to an I/O device simulated by the target circuit, or an instruction dealing with explicit hardware functions, such as RESET. Conversely, an event in the target circuit requiring interaction with the target program 22 may be, for example, an interrupt request generated by a target circuit component modeled in the hardware simulator 210.

The second function performed by the communications interface 220 is a resynchronization of the target program 22 and target circuitry. This resynchronization occurs on a periodic or other non-continuous basis even though neither the target program 22 nor the target circuit requires access to the other.

The communications interface 220 includes a controller 228 which may be implemented with a conventional microprocessor. The controller 228 is coupled to a memory 230 which stores a control program executed by the controller. The controller 228 is the component of the communications interface 220 which manages communications between the process emulator 202 and the hardware simulator 210 and controls the synchronization of the target program 22 and the operation of the simulated target circuit. To perform these functions, the controller 228 controls the operation of the other components of the communications interface 220, as will be described in detail below. Although the controller 228 is typically a microprocessor which executes the control program in memory 230, other suitable embodiments may likewise be used to perform the required control operations.

The communications interface 220 further includes a target bus watch circuit 224 coupled to the controller 228 over a local control bus 226, which includes all the necessary data, address, and control lines. The target bus watch circuit 224 is also coupled to the processor emulator 202 over a target bus 208 which includes all the address, data, and control lines associated with the target processor 204. The target bus watch circuit 224 includes circuitry which allows the controller 228 to send information to and receive information from the processor emulator 202. The information sent to the processor emulator 202 includes a HOST INTERRUPT request generated by the simulation of the target circuit running in the hardware simulator 210 as will be described in detail below. In addition, the target bus watch circuit 224 includes circuitry which performs the function of monitoring the target bus 208 to determine if an event in the target program 22 needs access to the target circuitry. Finally, the communications interface 220 includes a simulation time keeper circuit 232 which determines when the target program 22 will be synchronized to the operation of the hardware simulated by the hardware simulator 210 as described in detail below.

One skilled in the art will appreciate that the functions of the components of the testing system 200 shown in FIG. 7 can be easily built and implemented by one skilled in the art using hardware circuits or software to perform the various functions.

Figure 8:
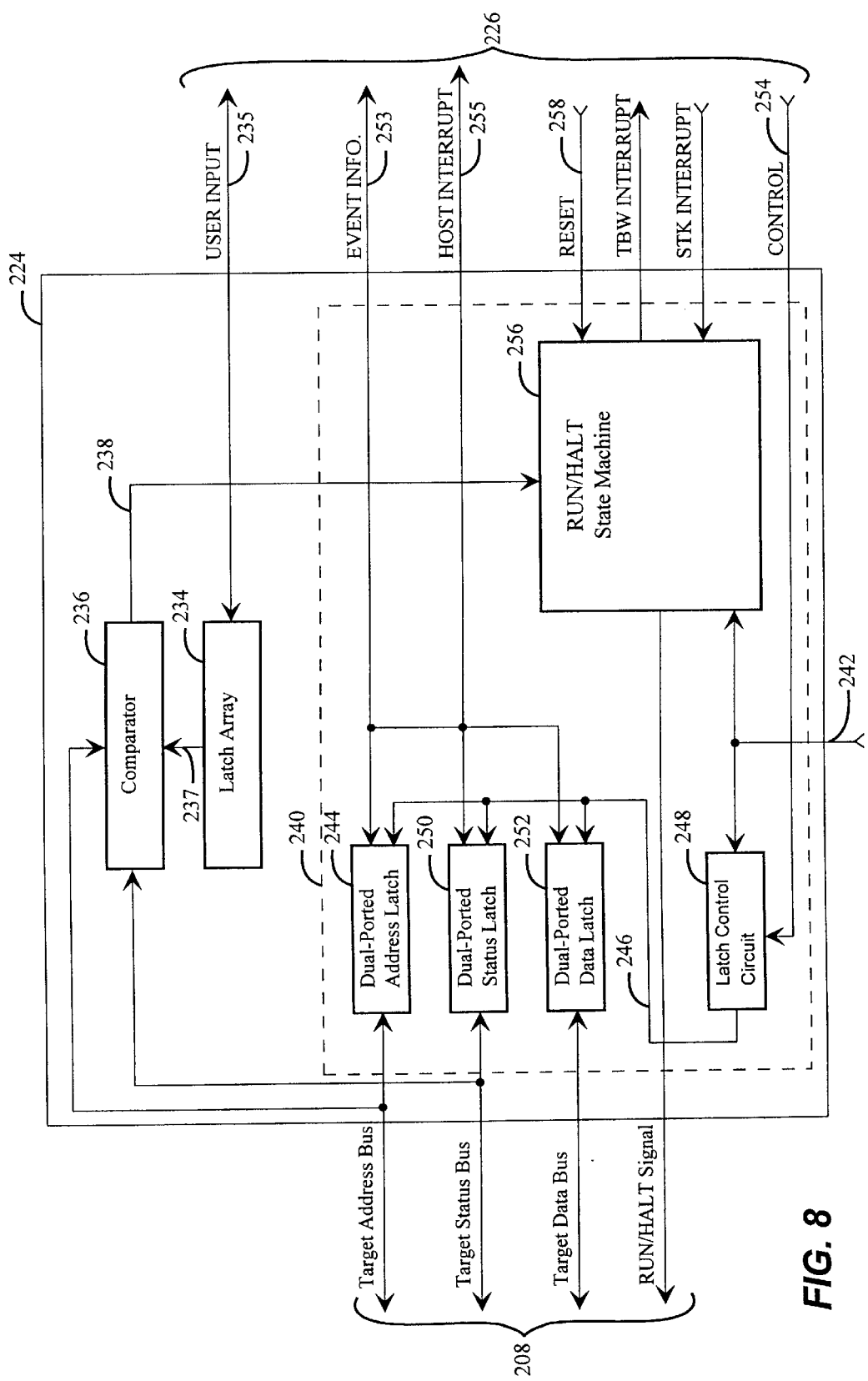
FIG. 8 is a more detailed functional block diagram of the target bus watch circuit of FIG. 6.
Figure 9:
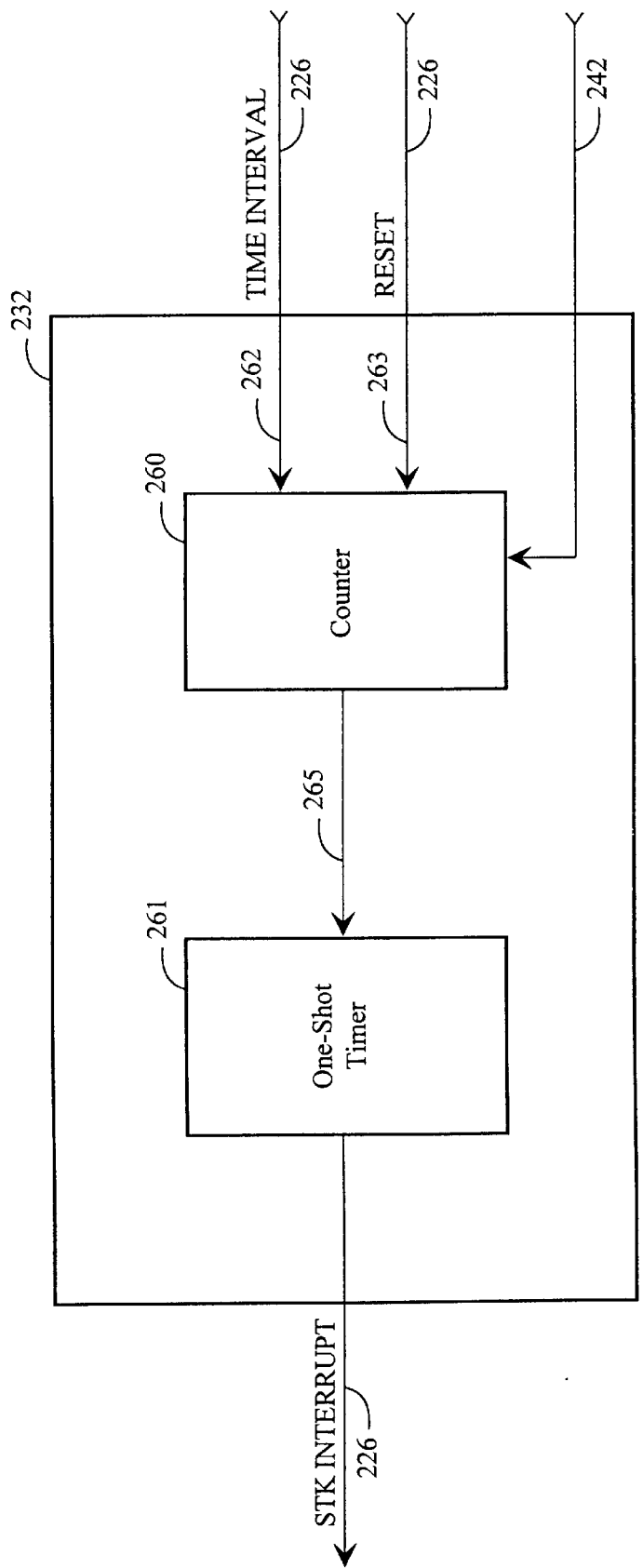
FIG. 9 is a more detailed functional block diagram of the simulation time keeper circuit shown in FIG. 7.

FIG. 8 is a more detailed functional block diagram showing the components of the target bus watch circuit 224 in accordance with one embodiment of the present invention. The target bus watch circuit 224 includes a latch array 234 which stores the address ranges of the target circuit components simulated on the hardware simulator 210. This address space may also include ranges of memory or I/O addresses allocated to the target circuit. The address space for the target circuit components are typically defined and entered by the user on the host computer 214. The address ranges entered by the user define the desired address for each simulated target circuit memory and I/O component. Although address ranges are referred to herein, one skilled in the art will realize a target circuit component may have only a single address. Once this address information is entered on the host computer 214, the information is communicated on the communication link 222 to the controller 228. The controller 228 then communicates the address information on a line 235 of the local control bus 226 and stores the information in the latch array 234. The latch array 234 provides an output 237 of the stored address ranges. In one embodiment, the latch array 234 is a fast memory array.

A comparator circuit 236 is coupled to the output 237 of the latch array 234, and is coupled to the address and status lines of the target bus 208. The comparator circuit 236 functions to monitor the target bus 208 and compare the address and status requests of the target program 22 with the address ranges stored in the latch array 234. If the target program 22 requires access to a target circuit component in the hardware simulator 210, then the value on the address lines will be within an address range stored in the latch array 234. When an address or status value is within an address range stored in the latch array 234, the comparator circuit 236 provides an appropriate output on line 238.

The target bus watch circuit 224 further includes a RUN/HALT controller 240. The RUN/HALT controller 240 performs two functions. First, the RUN/HALT controller 240 halts the execution of the target program 22 when it determines the target program requires access to the target circuit or when it determines a synchronization of the target program 22 and the simulated target circuit is required. Second, the RUN/HALT controller 240 facilitates communication between the controller 228 and the processor emulator 202. To perform these functions, the RUN/HALT controller 240 includes a dual-ported address latch 244. One port of the dual-ported address latch 244 is coupled to the address lines of the target bus 208. A second port of the dual-ported address latch 244 is coupled to a line 253 on local control bus 226. Similarly, the RUN/HALT controller 240 includes a dual-ported status latch 250 having one port coupled to the status lines of the target bus 208 and a second port coupled to the line 253 on the local control bus 226. Finally, a dual-ported data latch 252 has one port coupled to the data lines of the target bus 208 and the other port coupled to the line 253 on the local control bus 226. A signal 246 is output by a latch control circuit 248 to control the operation of the dual-ported address, status, and data latches 244, 250, and 252, respectively. The latch control circuit 248 uses the signal 246 to control which port of the dual-ported latches 244, 250, and 252 is latching event information on the line 253 and which port is subsequently serving as the output port of the dual-ported latch for that event information. Operation of the latch control circuit 248 is managed by the controller 228, which is coupled to the latch control circuit 248 through a control signal on a line 254 of the local control bus 226. A clock 242 drives the latch control circuit 248, this clock typically being the same clock which drives the processor 204.

In operation, the controller 228 applies signals to the target address bus, status bus and/or data bus by storing the signals in the address latch 244, status latch 250, and data latch 252, respectively. The signals are then applied to the appropriate bus by the corresponding latches 244, 250, 252. Transfer of information from the processor emulator 202 to the controller 228 through the latches 244, 250, 252 occurs in the reverse sequence.

The RUN/HALT controller 240 further includes a RUN/HALT state machine 256. The function of the RUN/HALT state machine 256 is to synchronize a request to halt the processor 204 with the bus cycle of the processor. In effect, the state machine 256 effectively causes the processor 204 to go into an extended wait-state mode until the required task is accomplished. A request to halt the processor 204 occurs in two instances. First, when the target program 22 needs access to the simulated target circuit. In that instance, the state machine 256 is coupled to the output 238 of the comparator 236. When the value of the output indicates the target program 22 needs access to the simulated target circuit, the RUN/HALT state machine 256 provides a RUN/HALT signal on a line of the target bus 208. This RUN/HALT signal causes the processor 204 to halt execution of the target program 22. Immediately after outputting the RUN/HALT signal, the state machine 256 provides a TBW INTERRUPT on a line of the local control bus 226. In response to the TBW INTERRUPT, the controller 228 communicates the required event information on line 253 between the target program 22 and the simulated target circuit.

The second instance where the processor 204 is halted by the state machine 256 using the RUN/HALT signal is when a synchronization of the target program 22 and the simulated target circuit is required. In this instance, the state machine 256 provides the RUN/HALT signal when it receives STK INTERRUPT from the simulation time keeper circuit 232.

As will be described in more detail below, the STK INTERRUPT is output by the simulation time keeper circuit 232 when such a synchronization is required.

In operation, the target bus watch circuit 224 monitors the data address, and status lines on the target bus 208 of the processor emulator 202. The target bus watch circuit 224 detects when the processor 204 executes a computer instruction or event in the target program 22 that includes a reference to a memory or I/O address within the address space allocated to the simulation of the target circuitry in the hardware simulator 210. Upon detection of such an event, the target bus watch circuit 224 outputs the RUN/HALT signal to halt execution of the target program 22 and at the same time outputs the TBW INTERRUPT to the controller 228. The controller 228 thereafter controls the dual-ported latches 244, 250, and 252 in the target bus watch circuit 224 to communicate required event information between the processor emulator 202 and the hardware simulator 210. After the controller 228 has completed processing the event, the controller resets the target bus watch circuit 224. Upon reset, the target bus watch circuit 224 removes the RUN/HALT signal and allows continued execution of the target program 22 by the processor emulator 202. The target bus watch circuit 224 also halts execution of the target program 22 running in the processor emulator 202 when the STK INTERRUPT is received from the simulation time keeper circuit 232. Finally, the controller 228 controls the dual-ported latches 244, 250, and 252 in the target bus watch circuit 224 to service the HOST INTERRUPT requests generated by the simulation of the target circuitry running in the hardware simulator 210.

Referring back to FIG. 7, the simulation time keeper circuit 232, which is part of the communications interface 220, is coupled to the local control bus 226. The simulation time keeper circuit 232 generates the STK INTERRUPT signal at appropriate times which is communicated over the local control bus 226 to the target bus watch circuit 224 and the controller 228. FIG. 8 illustrates a preferred embodiment of the simulation time keeper circuit 232. In this embodiment, the simulation time keeper circuit 232 includes a counter 260. The controller 228 is coupled to the counter 260 through the local control bus 226. Specifically, the controller 228 provides a TIME INTERVAL signal on a line 262 and a RESET signal on a line 263. The counter is driven by the clock signal on line 242. The value of the TIME INTERVAL signal on line 262 determines the count of the counter 260. The count in the counter 260 increments until it equals the value set by the TIME INTERVAL signal on line 262 (or may be decremented to zero if a decrementing counter is used). When the count equals the value of the TIME INTERVAL signal, the counter 260 provides an appropriate output on a line 265. This output on line 265 is coupled to a one-shot timer 261. Upon receiving the output on line 265, the one-shot timer 261 outputs the STK INTERRUPT signal on a line of the local control bus 226.

The value of the TIME INTERVAL signal 262 may be determined in a number of ways. First, a user may enter the desired value on the host computer 214. This value is communicated over the communications link 222 to the controller 228 which communicates this value via the TIMER INTERVAL signal on line 262 to the counter 260. When the valve of the TIMER INTERVAL signal on line 262 is constant, the simulation time keeper circuit 232 periodically generates the STK INTERRUPT signal. The controller 228 synchronizes the processor emulator 202 and hardware simulator 210 in response to the STK INTERRUPT signal. Once this synchronization is complete, the controller 228 provides the RESET signal on line 263 which causes the counter 260 to initialize and begin a new count. This reset of the counter 260 also changes the output on line 265 which causes the one-shot timer 261 to remove the STK INTERRUPT signal. In this mode of operation, the simulation time keeper circuit 232 periodically generates the STK INTERRUPT signal on the local control bus 226.

Alternatively, the value of the TIME INTERVAL signal on line 262 may be determined by special instructions known as "markers" contained in the target program 22. In this embodiment, a design engineer would scan his target program 22 and insert markers at desired locations in the target program. Such markers would determine the degree of synchronization of the target program 22 from that point on. Execution of a marker in the target program 22 would result in value of the TIME INTERVAL signal on line 262 being set to the value associated with that marker. The markers may set the value of the TIME INTERVAL signal on line 262 in a variety of different ways. For example, a marker address may be stored in the address space in the latch array 234. In this case, upon execution of a marker the execution of the target program 22 is halted by the target bus watch circuit 224 and the controller 228 controls the target bus watch circuit to receive information associated with the marker from the processor emulator 202. This information includes the special marker address on the target address bus which is processed by the controller 228 and recognized as a marker. In response to this marker address, the controller 228 sets the value of the TIME INTERVAL signal on line 262 to the value of the data contained on the target data bus of the processor emulator 202. In an alternative way for the markers to set the value of the TIME INTERVAL signal, a plurality of marker addresses could be stored in the address space in the latch array 234. Upon receipt of a specific marker address, the controller 228 could then set the TIME INTERVAL signal on line 262 to a value associated with that particular marker address. This method allows a design engineer to determine how each section of the target program 22 will be synchronized with the simulation of the target circuitry in the hardware simulator 210. Setting the time interval to zero would cause synchronization to occur at the execution of each instruction. Thus, with this method the synchronization is not periodic.

Operation of the communications interface 220 including its various components will now be discussed in more detail. First, the operation of the communications interface 220 is discussed when an event in the target program 22 needs access to the simulated target circuit. Upon detection of an event requiring interaction of the target program 22 and the target circuit, the target bus watch circuit 224 communicates the RUN/HALT signal on the target bus 208. The RUN/HALT signal causes the processor 204 to halt execution of the target program 22. When such an event is detected, the target bus watch circuit 224 also communicates the TBW INTERRUPT signal over the local control bus 226 to the controller 228. In response to the TBW INTERRUPT, the controller 228 communicates the required event information (in the first data format) over the communications link 222 to the host computer 214. The software kernel in the host computer 214 converts this event into the second data format used by the processor model shell 212. Depending on the nature of the event in the target program 22, the processor model shell 212 either writes to or reads from the simulated target circuitry. However, for an event such as a RESET no information need be read or written, so the processor model shell 212 would merely reset the simulation of the target circuit. The processor model shell 212 provides any information required by the event to the software kernel, which communicates this information and an acknowledgment of completion of the event over the communications link 222 to the controller 228. Upon receipt of this acknowledgment, the controller 228 activates the RESET signal on line 258 which causes the target bus watch circuit 224 to release the RUN/HALT signal and allow continued execution of the target program 22. If the event was a READ instruction, the controller 228 stores the data from the READ in the memory 206 of the processor emulator 202 before releasing the RUN/HALT signal.

In response to the STK INTERRUPT signal, from the simulation time keeper circuit 232, the RUN/HALT state machine 256 in the bus watch circuit 224 outputs the RUN/HALT signal to halt execution of the target program 22. The controller 228 also receives the STK INTERRUPT signal across the local control bus 226. When the controller 228 receives the STK INTERRUPT signal, the controller sends a command in the first data format over the communications link 222 to the host computer 214. This command is converted by the software kernel into the second data format for use by the processor model shell 212. The command tells the hardware simulator 210 it is time to synchronize with the target program 22. To synchronize, the hardware simulator 210 executes the software simulation of the target circuit until a simulation clock count contained in the simulation equals a target clock count in the target program 22 or until the simulation completes a pending transaction. Once the two clock counts are equal, the hardware simulator 210 communicates a clock synchronization acknowledge signal to the controller 228. Upon receiving the clock synchronization acknowledge signal, the controller 228 activates the RESET signal on line 258 which causes the target bus watch circuit 224 to release the RUN/HALT signal and allow continued execution of the target program 22.

The controller 228 also services interrupts from the hardware simulator 210. Interrupts from the hardware simulator 210 correspond to interrupts generated by the target circuitry. Such interrupts may, for example, represent the closure or opening of a switch, the pressing of a key on a keyboard, or may be a periodic request for service by the processor. Interrupts generated by the target circuitry are received by the processor model shell 212 and communicated to the software kernel, which converts the interrupt to a HOST INTERRUPT request in the first data format. This HOST INTERRUPT request is communicated over the communications link 222 to the controller 228. The controller 228 outputs the HOST INTERRUPT on line 255 to the target bus watch circuit 224 and controls the dual-ported latches 244, 250, and 252 to communicate the HOST INTERRUPT request to the processor emulator 202. Within the target program 22, the programmer typically creates an interrupt handling routine, which is invoked asynchronously upon receipt of the HOST INTERRUPT request. Facilities in the processor emulator 202 exist for interrupt masking, fully supporting the hardware equivalent found in the target system. These facilities ensure that the system 200 is compatible with interrupt driven code.

Figure 10:
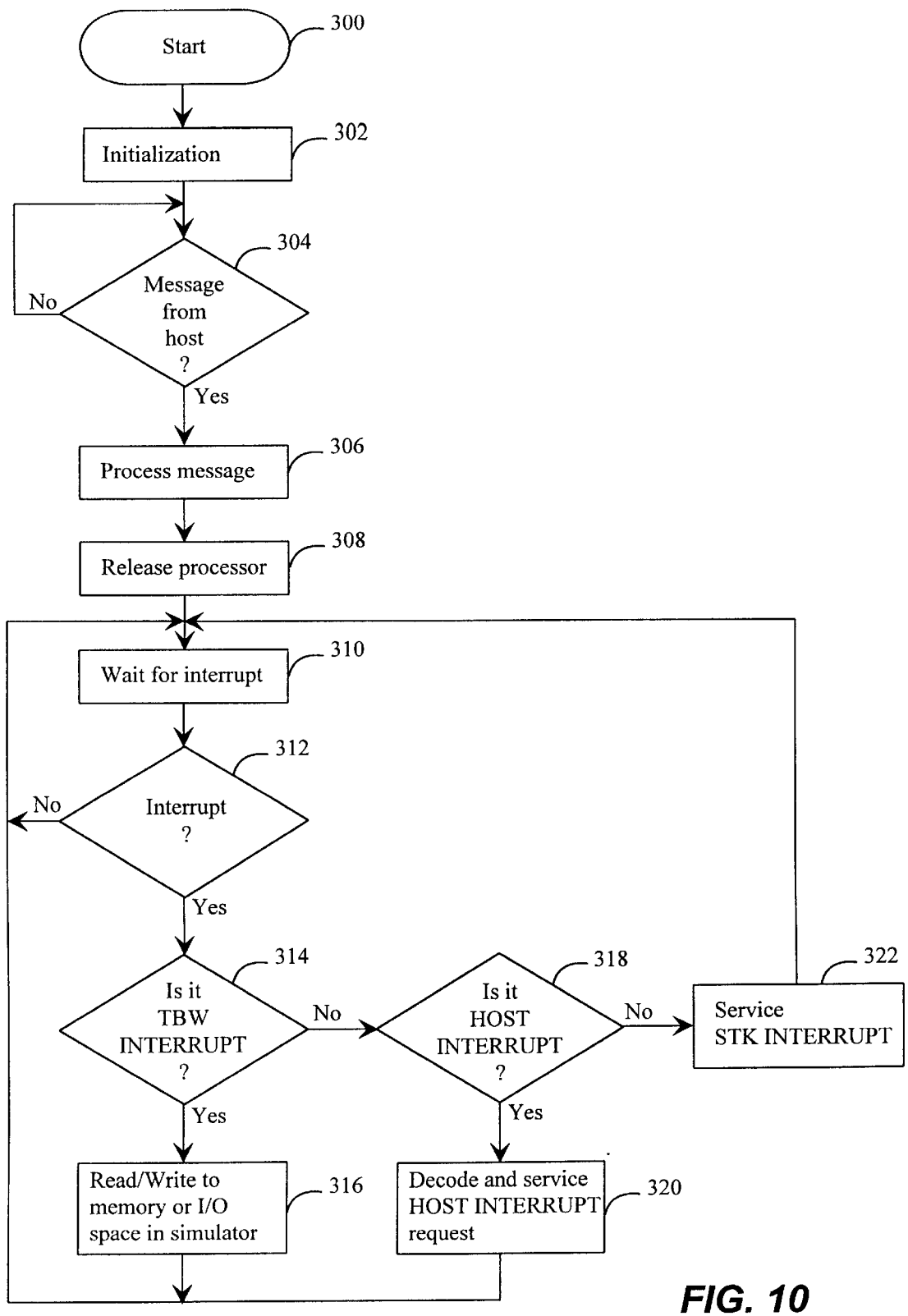
FIG. 10 is a flowchart illustrating the control process executed by the controller of FIG. 7.

FIG. 10 is a flowchart of the control program executed by the controller 228 in one embodiment of the present invention. The control program begins in step 300 and proceeds immediately to step 302. In step 302, the controller 228 initializes the target bus watch circuit 224, simulation time keeper circuit 232, and the processor emulator 202. Initialization of the target bus watch circuit 224 causes that circuit to activate the RUN/HALT signal and thereby place the processor 204 in a wait-state mode. After initializing these components, the controller 228 waits to receive a message from the host computer 214 in step 304. When the controller 228 receives a message from the host computer 214, the program proceeds to step 306 and processes that message. In step 306, the controller 228 may, for example, be instructed by the host computer 214 to load the memory 206 contained in the process emulator 202 with computer instructions, including the target program 22, or to transfer data into the memory 206. Upon processing the message in step 306, the program proceeds to step 308 where the controller 228 instructs the target bus watch circuit 224 to release the processor 204 to execute the target program 22.

From step 308, the program proceeds to step 310. In step 310, the controller 228 waits to receive an interrupt from: (1) the target bus watch circuit 224 in the form of the TBW INTERRUPT; (2) the simulation time keeper circuit 232 in the form of the STK INTERRUPT, or (3) the hardware simulator 210 in the form of the HOST INTERRUPT. From step 310, the control program proceeds to step 312 and determines if one of these interrupts has been received. If this determination is negative, the program goes back to step 310. The controller 228 continues to wait until such an interrupt is received. Once an interrupt is received the determination in step 312 is positive and the control program proceeds immediately to step 314. In step 314, the control program determines whether the interrupt is the TBW INTERRUPT from the target bus watch circuit 224.

If the controller 228 has received the TBW INTERRUPT, the control program proceeds to step 316. In step 316, the controller 228 processes the TBW INTERRUPT and provides the information required by the event causing the TBW INTERRUPT to the target program 22 or to the hardware simulator 210, as required. It should be noted, that a TBW INTERRUPT from the target bus watch circuit 224 does not always require information to be transferred from the target program 22 to the hardware simulator 210, or data to be read from the hardware simulator 210 into the target program 22. For example, the TBW INTERRUPT could be a RESET of the simulated target circuitry in the hardware simulator 210. In such a case, the simulated target circuit need merely be initialized, and no information need be communicated between the target program 22 and the hardware simulator 210. From step 316, the control program proceeds back to step 310.

If the interrupt received by the controller 228 is not the TBW INTERRUPT, the control program proceeds to step 318. In step 318, the controller 228 determines whether the interrupt received was the HOST INTERRUPT request generated by the hardware simulator 210. If the interrupt is the HOST INTERRUPT request, the control program proceeds to step 320. In step 320, the control program decodes the HOST INTERRUPT request and services that request.

When the controller 228 determines in step 318 that the interrupt is not from the hardware simulator 210, this means the interrupt must be the STK INTERRUPT from the simulation time keeper circuit 232. The program proceeds immediately to step 322 and services the STK INTERRUPT by halting execution of the target program 22 until the target program receives confirmation from the hardware simulator 210 that the simulation of the target circuit is synchronized with the target program. Once the target program 22 and the hardware simulator 210 are synchronized, the control program proceeds back to step 310 and waits for the next interrupt.

Figure 11:
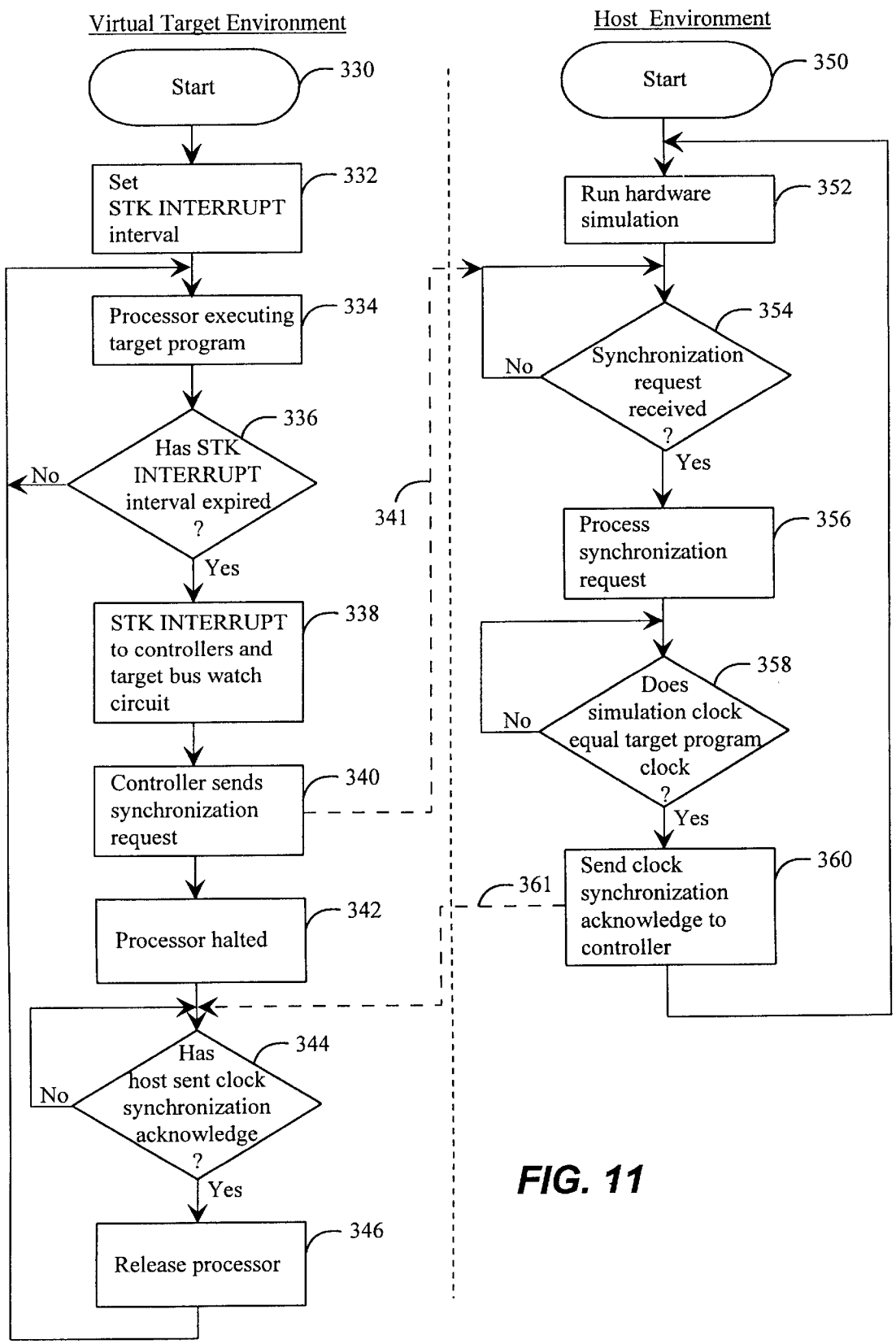
FIG. 11 is a flowchart illustrating the process of the present system for synchronizing the target program and the software simulation of the target circuitry.

FIG. 11 is a flowchart illustrating the "loose synchronization" process of the system 200 for periodically synchronizing the target program 22 and the hardware simulator 210 in response to the STK INTERRUPT generated by the simulation time keeper circuit 232. As mentioned above, instead of using the prior art approach of synchronizing the target program 22 with the hardware simulator 210 only when the target program 22 calls for an interaction with the simulated hardware, the preferred embodiment of the invention allows the user to determine when synchronization should occur. The user can cause the simulation time keeper circuitry 232 to periodically synchronize the target program 22 with the hardware simulator 210. The user can also place markers at appropriate places in the target program 22 to cause the simulation time keeper circuitry to synchronize upon the occurrence of specified software events. Other "loose synchronization" techniques will be apparent to one skilled in the art to synchronize the target program 22 with the hardware simulator 210 at times other than when the target program 22 interacts with the simulated hardware.

The flowchart under the heading "Virtual Target Environment" in FIG. 11 corresponds to the process executed by the communications interface 220 during the synchronization initiated by the STK INTERRUPT. The flowchart under the heading "Host Environment" illustrates the process executed by the host computer 214 during the synchronization initiated by the STK INTERRUPT.

The process in the virtual target environment begins in step 330 and proceeds immediately to step 332. In step 332, the interval to be timed by the simulation time keeper circuit 232 is set. As previously described, this interval may be set by the user through the host computer 14 or by markers in the target program 22. From step 332, the process proceeds to step 334. In step 334, the processor 204 is executing the target program 22. The process then proceeds to step 336. Step 336 determines whether the interval being timed by the simulation time keeper circuit 232 has expired. If the determination in step 336 is negative, the process proceeds back to step 334 and the target program 22 continues execution. When the interval has expired, the process proceeds to step 338. When the simulation time keeper circuit 232 determines the interval has expired, the simulation time keeper circuit provides the STK INTERRUPT to the target bus watch circuit 232 and to the controller 228. The process then proceeds to step 340.

In step 340, the controller 228 sends a synchronization request to the host computer 214 that the hardware simulator 210 must be synchronized with the target program 22. This is indicated by the dotted line 341. The process then proceeds to step 342 and the processor 204 is halted by the target bus watch circuit 224. From step 342, the process proceeds to step 344. In step 344, the controller 228 waits for a clock synchronization acknowledge from the host computer 214 indicating that the hardware simulator 210 has been synchronized with the target program 22. Once the controller 228 receives the clock synchronization acknowledge from the host computer 214, the process proceeds to step 346 and the controller instructs the target bus watch circuit 224 to release the processor 204 and execution of the target program 22 continues in step 334.

The process executed by the host computer 214 begins in step 350 and proceeds immediately to step 352. In step 352, the host computer 214 is running the hardware simulator 210. From step 352, the process proceeds to step 354. In step 354, the process determines whether the controller 228 has sent a synchronization request to the host computer 214 (see step 340). If this determination is negative, the process waits until such a request is received from the controller 228. When the determination in step 354 is positive, the process proceeds to step 356. In step 356, the host computer 314 processes the synchronization request from the controller 228. From step 356, the process proceeds to step 358. In step 358, the process determines whether the simulation clock of the hardware simulator 210 is equal to the target program clock of the processor emulator 202. If the two clocks are not equal, the process waits until they are equal. Once the two clocks are equal in step 358, the process proceeds to step 360. In step 360, the host computer 214 sends the clock synchronization acknowledge to the controller 228. This is indicated by the dotted line 361.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

I claim:

1. A system for testing and analyzing electronic systems, including a target microprocessor and simulated target circuitry, and an associated target program to be executed on the target microprocessor, comprising:

a processor emulator employing a hardware device for emulating the target microprocessor, the processor emulator having a memory for storing a plurality of computer instructions, the computer instructions including the target program and the processor emulator communicating with the memory to receive computer instructions from the memory;

a hardware simulator adapted to simulate the target circuitry; and a communications interface to control communication between the processor emulator and the hardware simulator, the processor emulator communicating with the hardware simulator using the communications interface when an event requires interaction of the target program with the target circuitry, the communications interface further including a synchronization circuit which synchronizes the processor emulator and the hardware simulator at a time other than when an event requires interaction of the target program with the target circuitry.

2. The system of claim 1 wherein the synchronization circuit periodically synchronizes the processor emulator and the hardware simulator.

3. The system of claim 2 wherein the synchronization circuit synchronizes the processor emulator and the hardware simulator at constant periods.

4. The system of claim 1 wherein the times at which the synchronization circuit synchronizes the processor emulator and the hardware simulator are determined in response to computer instructions contained in the target program.

5. The system of claim 1 wherein the processor emulator is coupled to the hardware simulator by a computer network connection, the communications interface controlling communications over the network.

6. The system of claim 1 wherein the communications interface comprises a target bus watch circuit to detect an event requiring the target program to interact with the target circuitry.

7. The system of claim 6 wherein the target bus watch circuit temporarily halts execution of the plurality of computer instructions while the hardware simulator processes the event requiring the target program to interact with the target circuitry.

8. The system of claim 1 wherein the communications interface comprises a dedicated, low latency communications channel.

9. The system of claim 1 wherein the event requiring the target program to interact with the target circuitry is an input/output(I/O) instruction to the hardware simulator, and the communication interface controls communication of the I/O instruction from the processor emulator to the hardware simulator.

10. The system of claim 1 wherein the processor emulator comprises a microprocessor emulator with the memory integrated therein, the integrated memory containing the computer instructions and associated data structures.

11. The system of claim 1 wherein the processor emulator is a hardware circuit emulator with the memory integrated therein, the integrated memory containing the computer instructions and associated data structures.

12. The system of claim 1, further including a computer communicating with the processor emulator, the computer also executing the hardware simulator.

13. A system for testing and analyzing electronic systems, including a target microprocessor and simulated target circuitry, and an associated target program to be executed on the target microprocessor, comprising:

a processor emulator including the target processor and a memory for storing data and a plurality of computer instructions, including the target program, the target processor communicating with the memory over a target bus to receive computer instructions from the memory, the target bus containing address, data, and status information;

a hardware simulator adapted to simulate the target circuitry, the hardware simulator providing a HOST INTERRUPT signal when the target circuitry needs access to the target program;

a target bus watch circuit coupled to the target bus of the processor emulator which detects when an event requires interaction of the target program with the target circuitry and in response to detecting such an event outputs a TBW INTERRUPT signal;

a simulation time keeper circuit which periodically generates a STK INTERRUPT signal; and a communications controller which controls communication between the processor emulator and the hardware simulator in response to the HOST INTERRUPT, TBW INTERRUPT, and STK INTERRUPT signals, the communications controller synchronizing the processor emulator and the hardware simulator when the communications controller receives at least one of the TBW INTERRUPT signal and the STK INTERRUPT signal.

14. The system of claim 13 wherein the target bus watch circuit comprises:

a memory latch array which stores information indicative of the address range in which the data and computer instructions are stored in the memory;

a comparator circuit which compares target address information on the target bus to the information indicative of the address range stored in the memory latch array and provides an output signal when the target address is outside the address range; and a RUN/HALT controller coupled to the output signal from the comparator circuit which in response to that output signal provides the TBW INTERRUPT signal and further provides a RUN/HALT signal to the processor emulator which causes the target processor to halt execution of the target program, the RUN/HALT controller further providing the RUN/HALT signal to the processor emulator in response to the STK INTERRUPT signal from the simulation time keeper circuit.

15. The system of claim 14 wherein the RUN/HALT controller comprises:
   a dual-ported address latch having one port coupled to the target address bus of the processor emulator and the other port coupled to the communications controller;
   a dual-ported data latch having one port coupled to the target data bus of the processor emulator and the other port coupled to the communications controller;
   a dual-ported status latch having one port coupled to the target status bus of the processor emulator and the other port coupled to the communications controller;
   a latch control circuit which controls the latching of data by the dual-ported address latch, the dual-ported data latch, and the dual-ported status latch, the latch control circuit being controlled by the communications controller to allow the communications controller to send address, data, and status information to the hardware simulator and interrupt information from the hardware simulator to the processor emulator; and
   a target processor state machine adapted for the specific target processor which provides the RUN/HALT signal and the TBW INTERRUPT signal, the communications controller controlling the target processor state machine so that the target processor state machine releases the processor emulator to continue execution of the target program after the controller has synchronized the processor emulator and the hardware simulator.

16. The system of claim 14 wherein the comparator circuit comprises a plurality of pairs of comparator logic circuits to determine whether a specific target address is outside the address range stored in the memory latch array, the address range including a lower address value and an upper address value, and each pair of comparator logic circuits comprising:
   a first comparator logic circuit which provides a true output when the specific target address is greater than or equal to the lower address value;
   a second comparator logic circuit which provides a true output when the specific target address is less than or equal to the upper address value; and
   a logical AND circuit having as its inputs the outputs from the first and second comparator logic circuits and providing a true output when both the outputs from the first and second comparator logic circuits are true.

17. The system of claim 16 wherein the output from each AND circuit associated with each pair of the comparator logic circuits is connected to an input of an OR logic circuit and an output from the OR circuit provides the output signal from the comparator circuit.

18. The system of claim 14 wherein the memory latch array and the comparator circuit are implemented in a fast memory array and combinatorial logic, respectively.

19. The system of claim 13 wherein the simulation time keeper circuit comprises a one-shot programmable interval timer.

20. A method for testing and analyzing electronic systems, such systems including a target microprocessor and simulated target circuitry, and an associated target program to be executed on the target microprocessor, comprising the steps of:
   storing a plurality of computer instructions in a memory, the computer instructions including the target program;
   emulating the target microprocessor using a processor emulator hardware device, the processor emulator communicating with the memory to receive computer instructions from the memory;
   simulating the target circuitry using a hardware simulator;
   controlling communication between the processor emulator and the hardware simulator, the processor emulator communicating with the hardware simulator when an event requires interaction of the target program with the target circuitry; and
   synchronizing the processor emulator and the hardware simulator at a time other than when an event requires interaction of the target program with the target circuitry.

21. The method of claim 20 wherein the step of synchronizing the processor emulator and the hardware simulator periodically synchronizes the processor emulator and the hardware simulator.

22. The method of claim 21 wherein the step of synchronizing the processor emulator and the hardware simulator synchronizes the processor emulator and the hardware simulator at constant periods.

23. The method of claim 20 wherein the times at which the synchronization circuit synchronizes the processor emulator and the hardware simulator are determined in response to computer instructions contained in the target program.

24. The method of claim 20 wherein the step of controlling communication includes the step of communicating over a computer network connection.

25. The method of claim 20 wherein the step of controlling communication includes the step of communicating over a dedicated low latency communications channel.

26. The method of claim 20 wherein the step of controlling communication includes the step of detecting an event requiring the target program to interact with the target circuitry.

27. The method of claim 26 wherein the step of detecting includes the step of halting temporarily the execution of the plurality of computer instructions while the hardware simulator processes the event requiring the target program to interact with the target circuitry.

28. The method of claim 26 wherein the event requiring the target program to interact with the target circuitry is an input/output(I/O) instruction to the hardware simulator, and the step of controlling communication controls communication of the I/O instruction from the processor emulator to the hardware simulator.

29. The method of claim 20 wherein the step of emulating the target microprocessor includes the step of using a microprocessor emulator coupled to a memory device, the memory device containing data and the computer instructions.

30. The method of claim 20 wherein the step of emulating the target microprocessor includes the step of using a hardware circuit emulator coupled to a memory device, the memory device containing data and the computer instructions.

31. The method of claim 20, further including the step of using a computer to communicate with the processor emulator, the computer also executing the hardware simulator.

32. An apparatus for synchronizing a processor emulator and a hardware simulator, the processor emulator including a target program and the hardware simulator including a simulation of a target circuit, comprising:

a communications interface to control communication between the processor emulator and the hardware simulator, the communications interface providing communication between the processor emulator and the hardware simulator when an event requires interaction of the target program with the target circuitry; and a synchronization circuit coupled to the communications interface which synchronizes the processor emulator and the hardware simulator at a time other than when an event requires interaction of the target program with the target circuitry.

33. The apparatus of claim 32 wherein the synchronization circuit periodically synchronizes the processor emulator and the hardware simulator.

34. The apparatus of claim 33 wherein the synchronization circuit synchronizes the processor emulator and the hardware simulator at constant periods.

35. The apparatus of claim 32 wherein the times at which the synchronization circuit synchronizes the processor emulator and the hardware simulator are determined in response to computer instructions contained in the target program.

* * * * *